United States Patent
Fortier (10) Patent No.: US 9,158,919 B2
(45) Date of Patent: Oct. 13, 2015

(54) THREAT LEVEL ASSESSMENT OF APPLICATIONS

(75) Inventor: Dominique Fortier, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/158,459

(22) Filed: Jun. 13, 2011

(65) Prior Publication Data

US 2012/0317645 A1 Dec. 13, 2012

(51) Int. Cl.
| | |
|---|---|
| G06F 11/00 | (2006.01) |
| G06F 12/14 | (2006.01) |
| G08B 23/00 | (2006.01) |
| G06F 21/56 | (2013.01) |

(52) U.S. Cl.
CPC ............ *G06F 21/566* (2013.01); *G06F 21/562* (2013.01)

(58) Field of Classification Search
CPC ........................................................ G06F 8/65
USPC .............. 726/1, 4, 24–25; 717/120, 126–127, 717/155
See application file for complete search history.

(56) References Cited

U.S. PATENT DOCUMENTS

| | | | |
|---|---|---|---|
| 7,284,274 B1 | 10/2007 | Walls et al. | |
| 7,418,733 B2 | 8/2008 | Connary et al. | |
| 7,784,099 B2 | 8/2010 | Benjamin | |
| 8,141,049 B2 * | 3/2012 | Kahlon | 717/126 |
| 8,443,354 B1 * | 5/2013 | Satish et al. | 717/156 |
| 2005/0044541 A1 * | 2/2005 | Parthasarathy et al. | 717/173 |
| 2005/0108562 A1 * | 5/2005 | Khazan et al. | 713/200 |
| 2005/0188419 A1 | 8/2005 | Dadhia et al. | |
| 2005/0283622 A1 | 12/2005 | Hall et al. | |
| 2006/0101413 A1 * | 5/2006 | Kinno et al. | 717/127 |
| 2006/0253580 A1 * | 11/2006 | Dixon et al. | 709/225 |
| 2007/0192866 A1 | 8/2007 | Sagoo et al. | |
| 2008/0022274 A1 | 1/2008 | Shieh | |
| 2008/0028470 A1 * | 1/2008 | Remington et al. | 726/25 |
| 2009/0007223 A1 * | 1/2009 | Centonze et al. | 726/1 |
| 2009/0165077 A1 | 6/2009 | Heiner et al. | |
| 2009/0328209 A1 | 12/2009 | Nachenberg | |
| 2010/0023926 A1 * | 1/2010 | Sugawara et al. | 717/120 |
| 2010/0064369 A1 * | 3/2010 | Stolfo et al. | 726/24 |
| 2011/0016356 A1 * | 1/2011 | Artzi et al. | 714/38 |

(Continued)

OTHER PUBLICATIONS

J. Bergeron; Static Analysis of Binary Code to Isolate Malicious Behaviors; Year: Sep. 9, 2009; IEEE;pp. 1-6.*

(Continued)

*Primary Examiner* — Monjour Rahim
(74) *Attorney, Agent, or Firm* — Henry Gabryjelski; Kate Drakos; Micky Minhas (57) ABSTRACT

An application safety system is described herein that provides a scoring system of how dangerous an application is based on behavioral inspection of the application. Upon detecting installation of an application or first execution of the application, the application safety system performs static analysis before the new application is executed by the operating system. The system allows the user to approve running the application after displaying information about what the application does. Next, the system performs dynamic analysis as the application runs and alerts the user to any potentially harmful behavior. Over time, the system determines when the application may be acting in a manner that is out of character and informs the user. The system also allows users to restrict behavior that a particular application can perform.

20 Claims, 4 Drawing Sheets

(56) References Cited

U.S. PATENT DOCUMENTS

2011/0030061 A1* 2/2011 Artzi et al. ................ 726/25
2011/0088023 A1* 4/2011 Haviv et al. ................ 717/155
2012/0023553 A1* 1/2012 Berg et al. ................ 726/4

OTHER PUBLICATIONS

Victor, et al., "Intrusion Detection Systems—Analysis and Containment of False Positives Alerts", Retrieved at <<http://www.ijcaonline.org/volume5/number8/pxc3871308.pdf>>, International Journal of Computer Applications, vol. 5 No. 8, Aug. 2010, pp. 27-33.

"Portable Lavasoft Ad-Aware Anniversary Pro Edition 8.0 Multilanguage", Retrieved at <<http://fcportables.blogspot.com/2009/01/portable-lavasoft-ad-aware-anniversary.html>>, Retrieved Date: Mar. 31, 2011, pp. 3.

"PC Pitstop Exterminate—Anti-Spyware, Anti-Malware, Anti-Virus", Retrieved at <<http://pcpitstop.com/store/exterminate.asp>>, Retrieved Date: Mar. 31, 2011, pp. 2.

"International Search Report", Mailed Date: Feb. 1, 2013, Application No. PCT/US2012/041808, Filed date: Jun. 11, 2012, pp. 9.

* cited by examiner

THREAT LEVEL ASSESSMENT OF APPLICATIONS

BACKGROUND

Users of computer systems acquire software applications from a variety of sources today. Whereas traditionally software was distributed by selling boxed software with optical or other disks on a retail store shelf, today users may download software applications from the Internet, install applications provided by one or more application stores or repositories (e.g., the Ubuntu Software Center and Mac App Store), receive applications via email, receive applications on a universal serial bus (USB) drive, and so forth. Software may still be purchased from a store, but has expanded from several well-known software companies to include many providers that may only make and sell one or two applications.

Malware and other harmful applications are increasingly problematic for computer users. Malware applications may steal or harm a user's data, make a computer system slower, steal processing resources and bandwidth for another user's purposes, or perform other harmful or undesired actions. A user traditionally has two methods for checking the safety of applications: 1) running an antivirus program that depends on matching signatures of known malware with software program code, and 2) developing a level of trust with the source of the software. In the former case, many applications that are not strictly malware may perform undesired actions or may be compromised in the future in a manner that antivirus software does not detect. Recently, software from a major software maker was criticized by many users for installing a rootkit that allowed unauthorized access to a computer system. Thus, neither antivirus software nor coming from a trusted source were sufficient to prevent the potential harm.

Users install many applications without sufficient information to know if the application is trustworthy. Software solves such a broad range of problems and there is a corresponding wide variety of applications that a user may identify as potentially being helpful that the user wants to install. After installation, the user may not know everything the application is doing to the user's system, and the user may be unaware if the behavior of the application changes over time. More help is needed to allow a user make an educated decision on whether or not to trust an application at installation time and upon subsequent sessions with the application.

SUMMARY

An application safety system is described herein that provides a scoring system of how dangerous an application is based on behavioral inspection of the application. Upon detecting installation of an application or first execution of the application, the application safety system performs static analysis before the new application is executed by the operating system. Static analysis can identify many types of behavior of an application, and the system can alert the user to whether the application saves and modifies files, connects to the Internet, uses email, or performs other actions. The system may allow the user to approve running the application after displaying information about what the application does or displaying a score calculated based on the system's determination of how dangerous the application's actions are.

Next, the system performs dynamic analysis as the application runs by hooking the application (e.g., like a debugger does) and watching how the application behaves. The system can alert the user to any potentially harmful behavior, and stores a baseline that describes how the application behaves normally. The baseline helps the system to determine when the application may be acting in a manner that is out of character. In addition, the system allows users to restrict behavior that a particular application can perform. Thus, the application safety system provides the user with a variety of information at installation time, at run time, and over time as the application's behavior changes and allows the user to restrict application behavior to a known/expected set of actions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Security vulnerabilities are often exploited when a user unknowingly or unintentionally allows a malicious application to execute. An application safety system is described herein that provides a scoring system of how dangerous an application is based on behavioral inspection of the application. The system may provide a threat level assessment to help users make more informed decisions before automatically choosing to execute an application. Upon detecting installation of an application or first execution of the application, the application safety system performs static analysis before the new application is executed by the operating system. Static analysis can identify many types of behavior of an application, and the system can alert the user to whether the application saves and modifies files, connects to the Internet, uses email, or performs other actions. The system may allow the user to approve running the application after displaying information about what the application does or displaying a score calculated based on the system's determination of how dangerous the application's actions are.

Next, the system performs dynamic analysis as the application runs by hooking the application (e.g., like a debugger does) and watching how the application behaves. The system can alert the user to any potentially harmful behavior, and stores a baseline that describes how the application behaves normally. The baseline helps the system to determine when the application may be acting in a manner that is out of character. For example, if an application has been run many times, but today for the first time is attempting to send email, the system can alert the user to this new behavior. In addition, the system allows users to restrict behavior that a particular application can perform. For some applications, it would not be appropriate for the application to use the Internet, modify files, or send email. The user can restrict such applications from performing these actions. Thus, the application safety system provides the user with a variety of information at installation time, at run time, and over time as the application's behavior changes and allows the user to restrict application behavior to a known/expected set of actions. Each of these allows the user to better protect the user's computing device from potential harm from malware.

The application safety system can learn a lot about an application during static analysis. Many tools exist, such as software code analyzers (e.g., MICROSOFT™ PREfast, Lint, and other tools), compilers that provide an object model for walking through compiled binary code, and other tools that can analyze software code statically (i.e., without executing the code) to determine what actions the code performs. The system can then inform the user at install or other time what type of action(s) this application is planning to perform. The system may generalize this information into a usage model (i.e., identifying an application as a heavy Internet application, a document creation application, and so forth). This can allow the user to compare the system's assessment of the application with the user's expectation of the application's purpose. Any difference will arouse suspicion and the user can then choose not to run or install the application. The system may also determine through static analysis potentially unsafe implementation that can lead to security vulnerabilities and inform the user of the potential threat. For example, the system may determine that the application installs and uses an outdated software runtime that includes known security holes. This way a user can make an informed decision.

During dynamic analysis (i.e., while the application is executing), the system can monitor application behavior and watch for potentially harmful actions. In some embodiments, the system sends application behavior information to a cloud-based service to generalize the application behavior over a large dataset. The system may compare information gathered from a large number of users and installations to determine how an application normally behaves, and thus to know whether the application is behaving abnormally on any particular occasion. If an application's behavior changes or steps outside of what is normally expected, then the system can warn the user or disable the application. For example, many applications contain extensibility interfaces or execute certain types of data that can be compromised to make the application behave in harmful ways. The system can catch applications that have been compromised before they can do harm to a user's computing device or data.

The application safety system can also shrink wrap the access surface of an application (e.g., creating a sandbox-like environment) and prevent the application from being able to be utilized to perform harmful tasks. For example, may be an application is only expected to communicate with a specific Uniform Resource Locator (URL). If so, any other communication could indicate a compromised application. The system may ask the user to approve access to the new location or simply shut down the application and inform the user that the application may be compromised. By comparing behavior on the user's computing device with behavior noted by users of thousands or more other devices, the system can have a high degree of confidence whether an application is acting normally or not. Thus, even if a user does not use an application feature often (but other users do), the system will avoid false positives and protect the user appropriately from rogue application behavior.

Figure 1:
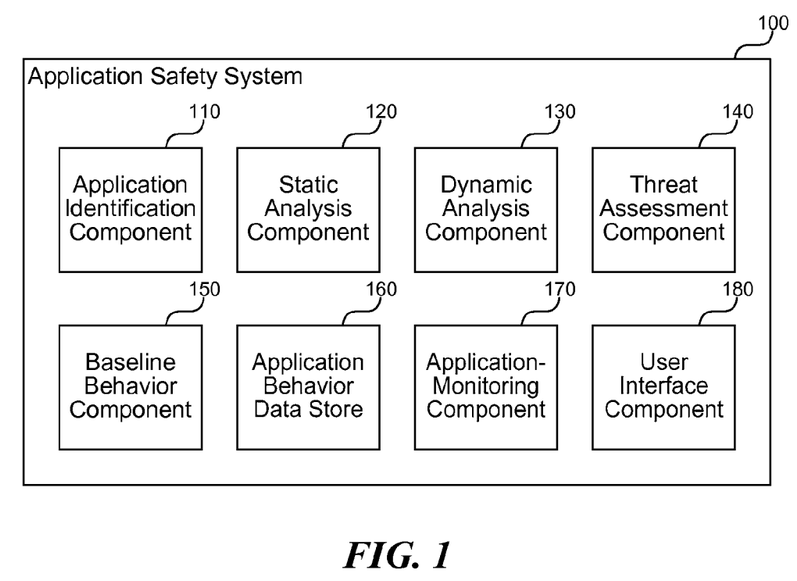
FIG. 1 is a block diagram that illustrates components of the application safety system, in one embodiment.

FIG. 1 is a block diagram that illustrates components of the application safety system, in one embodiment. The system 100 includes an application identification component 110, a static analysis component 120, a dynamic analysis component 130, a threat assessment component 140, a baseline behavior component 150, an application behavior data store 160, an application-monitoring component 170, and a user interface component. Each of these components is described in further detail herein.

The application identification component 110 identifies an application to analyze and for which to generate a threat assessment. The component 110 may identify applications by hooking operating system functions for installing and executing applications, so that the operating system informs the component 110 upon installing or running an application. The component 110 may compare the application with a list of previously analyzed applications to determine what type of analysis to perform on the application. For example, the system 100 may cache static analysis performed on each application so that repeating the static analysis is not needed unless the application has changed (e.g., due to an update). The system may perform dynamic analysis and monitoring each time an application is run to detect changes from the baseline behavior described herein, and to block the application from performing any blocked or forbidden actions.

The static analysis component 120 statically analyzes an application binary or other application code to determine how the application interacts with external resources. The component 130 may analyze binary code, intermediate code (e.g., MICROSOFT™ intermediate language (IL) code), or other compiled or runnable versions of an application. Static analysis has advanced substantially over the last few years, and many techniques are well known in the art for determining what an application binary does and how it does it. The system 100 uses these techniques to specifically focus on areas where the application interacts externally, such as with data, communications channels (e.g., the Internet, email, databases, and so forth), hardware, or other resources. The component 130 may instrument the application binary to receive information or intercept particular actions of the application and may replace intercepted actions with new or additional actions. For example, if the component 130 discovers a call to send email and the user has requested that the application be blocked from sending email, then the component 130 may replace the emailing function with a stub that does nothing. In this way, system 100 can control execution of applications and report application behavior to the user.

The dynamic analysis component 130 dynamically analyzes a running application to gather additional information related to the application's behavior that is difficult to determine with static analysis. Often applications include programming steps that frustrate static analysis (either intentionally or simply because the steps turn out that way). Dynamic analysis has information available, such as the contents of responses received from external components, the actual contents of memory used by the application, and user configuration information, for which only guesses or approximations are available during static analysis. Thus, dynamic analysis can potentially discover application behavior that is not found during static analysis. The component 130 can also use dynamic analysis to confirm results of static analysis. The dynamic analysis component 130 provides the determined information to the threat assessment component 170 for reporting any issues to the user. The component 130 may also enforce any restrictions placed on the application by the user. For example, if the user has restricted the application for accessing a particular disk drive, connecting to the Internet, sending email, reading the user's data, or other actions, then the component 130 blocks the application from doing so.

The threat assessment component 140 determines a threat assessment level to associate with the application based on static and/or dynamic analysis performed on the application. In some cases, the system may determine the application's threat level in stages. For example, at a first installation request, the system 100 may perform static analysis to avoid running the unknown application and report to the user a threat assessment level based on static analysis. Then, upon running the application, the system may perform dynamic analysis, update the threat assessment with any additional information, and report the threat level to the user again. At any point, the user may act to prevent the application either from running or from being installed on the system. In some embodiments, the system determines a score that indicates the threat assessment level. The score may be numeric, a series of stars for a rating, a stoplight (e.g., red=bad, yellow=caution, green=okay), or any other indication to the user. In some embodiments, the system may consult a database of known applications and may display to the user a threat assessment that includes an assessment determined by an expert or a set of other users.

The baseline behavior component 150 determines a baseline behavior of the application that indicates a summary of actions that the application has taken in the past. The system 100 uses the baseline behavior to identify behavior that is out of the ordinary for the application, so that the system 100 can warn the user or shut down the application before it does any harm or takes unexpected action. The system stores baseline behavior information in the application behavior data store 160 and may retrieve baseline behavior information submitted by other users of the application from the data store 160. By accumulating behavior data from multiple users, the system can develop a more complete assessment of behavior that is normal or unexpected for the application.

The application behavior data store 160 stores information describing normal application behavior. The data store 160 may include one or more files, file systems, hard drives, databases, storage area networks, cloud-based storage services, or other facilities for persisting data over time. The data store 160 may include information submitted by one or more users that run the application, and may make aggregated data from multiple users available to any user that runs the application. The data store 160 develops a complete assessment over time of how the application behaves normally and of behavior that would be out of the ordinary for the application.

The application-monitoring component 170 monitors the application each time the application is run to identify behavior that differs from the determined baseline behavior. For example, if an application has not previously attempted to access the Internet, but one day attempts to do so, the component 170 detects the new behavior and determines whether to warn the user. The component 170 may first consult the application behavior data store 160 to determine whether other users have experienced the same application behavior and what the response was to the new behavior (e.g., closing the application, allowing the application to continue, and so on). Based on the user's decision, the component 170 may block the application from performing the new behavior or may allow the application to continue if the user indicates that the behavior is expected.

The user interface component 180 provides an interface for displaying information to the user and receiving input from the user. The interface may include a desktop graphical user interface (GUI), a mobile interface, a console user interface (CUI), a web page, or any other type of facility for displaying information to the user. The user interface may integrate with other software applications, such as an operating system application installation wizard or application store, to display threat level information in other existing workflows, such as installing an application. The interface may also display input controls to a user, such as Yes/No buttons upon detecting a threat, so that the user can indicate whether an application will be allowed to install, run, or perform a particular action.

The computing device on which the application safety system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
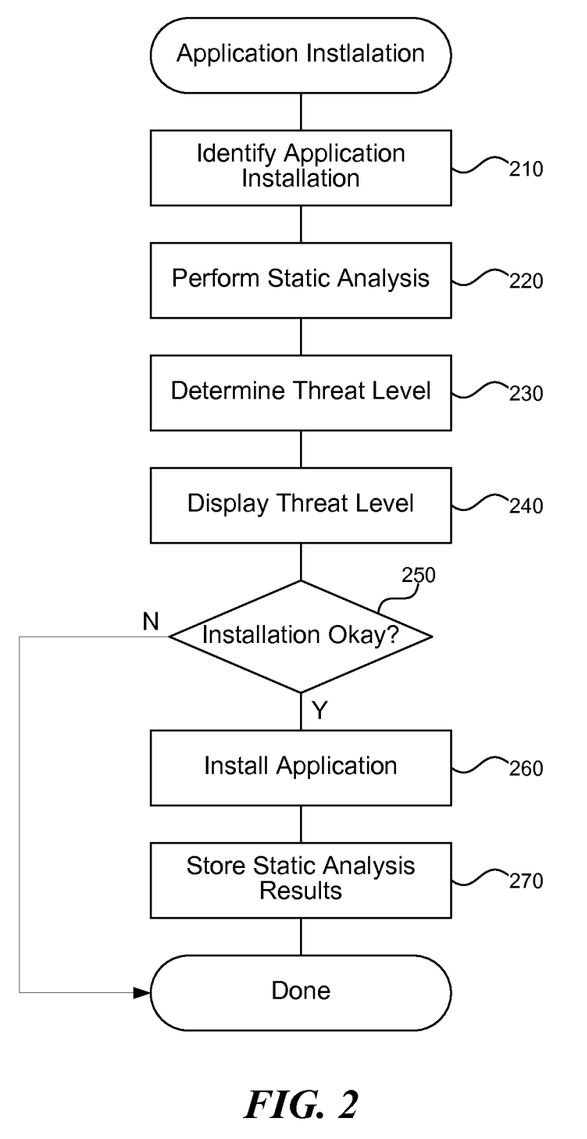
FIG. 2 is a flow diagram that illustrates processing of the application safety system to handle installation and assess a threat level of a new application, in one embodiment.

FIG. 2 is a flow diagram that illustrates processing of the application safety system to handle installation and assess a threat level of a new application, in one embodiment.

Beginning in block 210, the system identifies an application being installed on a computing device. For example, an operating system may provide notification to registered components upon installation of an application or the system may provide a driver or other hook for intercepting attempts to install applications. The system may run each time an application is installed and may determine metadata describing the application, such as an application source, any signer of a certificate associated with the application, whether the application matches a well-known application, and so forth.

Continuing in block 220, the system performs static analysis on the identified application. The static analysis accesses one or more application binary modules and determines what actions are performed by the binary code stored in the module. The actions may include some actions that are not considered harmful or interesting, such as performing internal calculations, and other actions that are potentially harmful, such as accessing data, sending information over the Internet or other network, accessing device hardware, and so forth.

Continuing in block 230, the system determines a threat level to assign to the application based on the static analysis and detected behavior of the application. The threat level may include a numerical or visual score or another indication of how much the user should worry about installing the application. The threat level may include a list of categories of or actual behavior performed by the application, as detected during static analysis. For example, the threat level may indicate whether the application accesses locally stored data, whether the application accesses the Internet, and so on.

Continuing in block 240, the system displays the determined threat level to the user through a user interface. The system may display the threat level in a dialog box, pop-up notification, iconic display, integrated in another user interface, or in any other manner that provides the threat level to the user. In some embodiments, the system may take automatic action and rather than display the threat level to the user may instead display the action taken (e.g., application was denied installation due to harmful behavior). When displayed, the threat level indication may request that the user indicate whether to continue installing the application (e.g., through Yes or No buttons).

Continuing in decision block 250, if the system determines that installation of the application is safe, then the system continues at block 250, else the system completes. The system may determine whether installation is safe based on the user's response to an inquiry requesting the user's approval to install the application. The user, after seeing the threat level, can decide whether installation will continue.

Continuing in block 260, the system installs the application on the computing device. Installation proceeds in the normal manner for whatever platform the computing device uses. For example, installation may copy files to the computing device, modify one or more configuration files or databases, register any operating system or other extensions, and so on. In some embodiments, the system may cause the application to be installed in a dedicated location, such as an application virtualization environment, virtual machine, or application sandbox until further analysis of the application has taken place.

Continuing in block 270, the system optionally stores the results of static analysis so that the results can be used during subsequent analysis of the application's behavior. In some cases, the static analysis may take significant time or consume enough resources that it is worthwhile to store the results of the analysis so that the results can be used again later without recreating the results. For example, the system may analyze the application again each time the application executes, and may combine static and dynamic analysis of the application's behavior. In such cases, the system may access a cached copy of the static analysis results. After block 270, these steps conclude.

Figure 3:
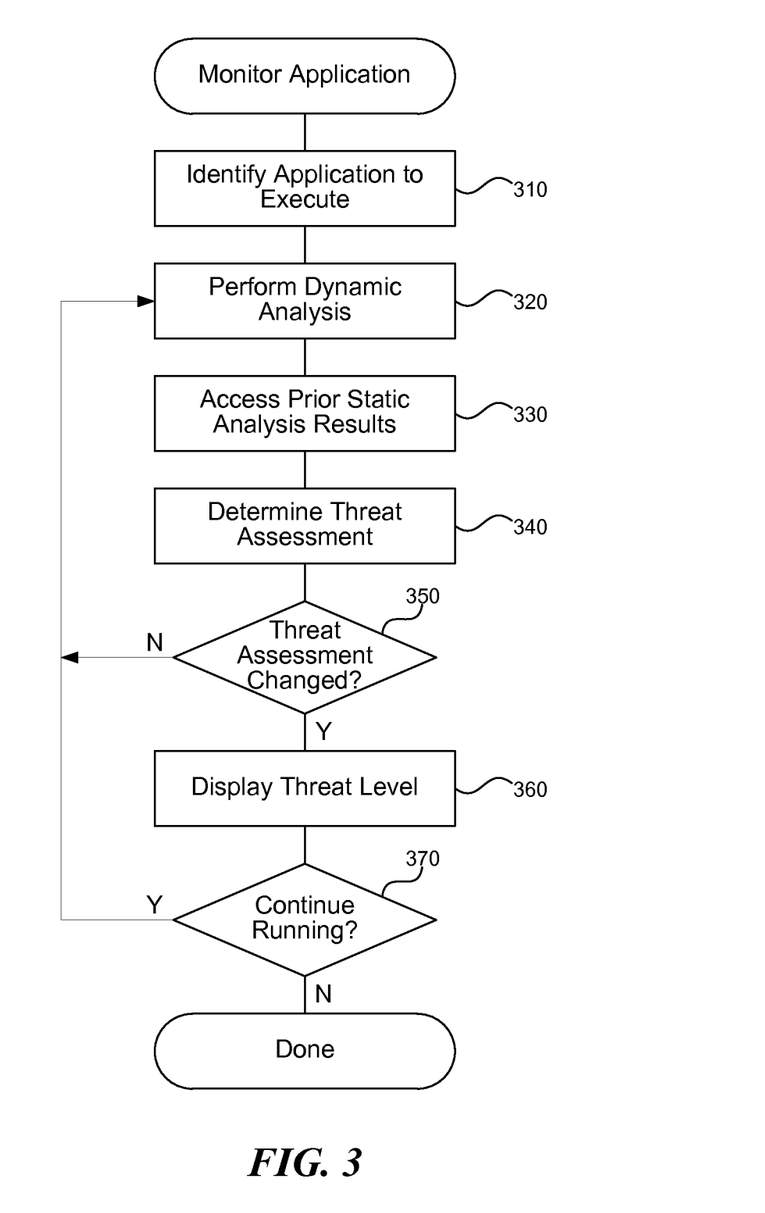
FIG. 3 is a flow diagram that illustrates processing of the application safety system to monitor a running application and identify any harmful behavior, in one embodiment.

FIG. 3 is a flow diagram that illustrates processing of the application safety system to monitor a running application and identify any harmful behavior, in one embodiment.

Beginning in block 310, the system identifies an application being executed on a computing device. For example, an operating system may provide notification to registered components upon execution of an application or the system may provide a driver or other hook for intercepting attempts to execute applications. The system may run each time an application is executed and may determine metadata describing the application, such as an application source, any signer of a certificate associated with the application, whether the application matches a well-known application, and so forth.

Continuing in block 320, the system performs dynamic analysis on the identified application. The dynamic analysis accesses one or more application binary modules loaded in memory and determines what actions are performed by the binary code stored in the module. The actions may include some actions that are not considered harmful or interesting, such as performing internal calculations, and other actions that are potentially harmful, such as accessing data, sending information over the Internet or other network, accessing device hardware, and so forth. Dynamic analysis may identify application behavior not identified during static analysis. For example, code that is obfuscated and difficult to analyze statically may be loaded in memory in a more accessible format during execution. In addition, user configuration data, environment data, and other information are available during run time that may not be available statically.

Continuing in block 330, the system accesses any prior static analysis results and incorporates the results into the dynamic analysis. The system can use dynamic analysis to confirm earlier static analysis and to augment any understanding of application behavior determined by dynamic analysis. The system may perform and store static analysis information during installation of the application (e.g., as shown in FIG. 2) or the first time the application is run on the computing device. The system may also access shared static and/or dynamic analysis information from a network-based storage service (e.g., such as that stored by other users of the application).

Continuing in block 340, the system determines a threat level to assign to the application based on the dynamic analysis and detected behavior of the application. The threat level may include a numerical or visual score or another indication of how much the user should worry about installing the application. The threat level may include a list of categories of or actual behavior performed by the application, as detected during static analysis. For example, the threat level may indicate whether the application accesses locally stored data, whether the application accesses the Internet, and so on. The system may compare the threat level to a previously determined threat level, such as a level determined during application installation or during a previous execution of the application.

Continuing in decision block 350, if the system determines that the threat level has changed from a previously determined threat level, then the system continues at block 360, else the system loops to block 320 to continue performing dynamic analysis while the application executes. The threat level may change for a variety of reasons, such as when new software code is loaded into the application's process, via normal operation or due to a virus or other malware. The system may also detect a change in behavior of the application and identify a change in threat level.

Continuing in block 360, the system displays the determined threat level to the user through a user interface. The system may display the threat level in a dialog box, pop-up notification, iconic display, integrated in another user interface, or in any other manner that provides the threat level to the user. In some embodiments, the system may take automatic action and rather than display the threat level to the user may instead display the action taken (e.g., application was closed due to harmful behavior). When displayed, the threat level indication may request that the user indicate whether to continue executing the application (e.g., through Yes or No buttons).

Continuing in decision block 370, if the system determines that the application may continue running, then the system loops to block 320 to continue performing dynamic analysis while the application executes, else the system shuts down the application and completes. The system may determine what action to take based on input from the user. For example, if the user expected the application behavior, then the user will likely allow the application to continue running. On the other hand, if the behavior is unexpected, then the user may terminate the application or perform additional corrective action such as invoking a virus scanner or other tools for verifying the application safety. After block 370, these steps conclude.

Figure 4:
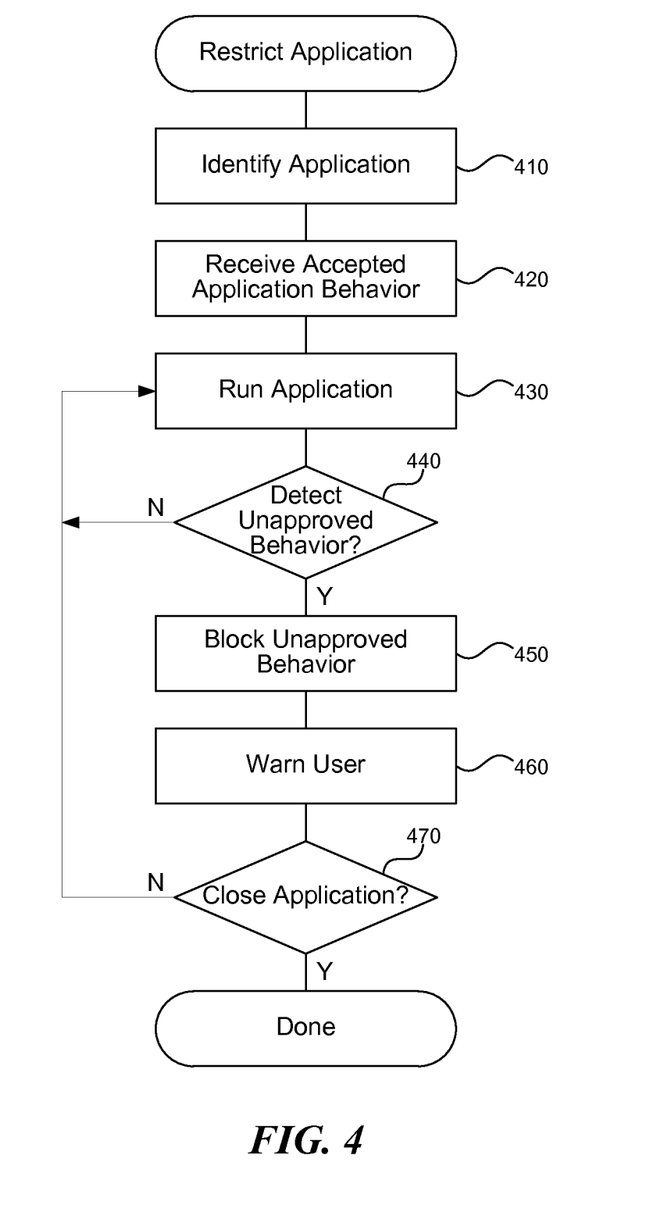
FIG. 4 is a flow diagram that illustrates processing of the application safety system to restrict application behavior, in one embodiment.

FIG. 4 is a flow diagram that illustrates processing of the application safety system to restrict application behavior, in one embodiment.

Beginning in block 410, the system identifies an application being executed on a computing device. For example, an operating system may provide notification to registered components upon execution of an application or the system may provide a driver or other hook for intercepting attempts to execute applications. The system may run each time an application is executed and may determine metadata describing the application, such as an application source, any signer of a certificate associated with the application, whether the application matches a well-known application, and so forth.

Continuing in block 420, the system receives information describing accepted behavior of the identified application. The accepted behavior may come from user configuration specified upon installation of the application or at another time. The accepted behavior may also come from a public or shared database of accepted application behavior. For example, an email reading application may be acting appropriate by connecting to the Internet, but a document reading application may not. Accepted application behavior may be described in categories of allowed behavior (e.g., access stored data, access a network, and so on) or by particular operating system and other application-programming interfaces (APIs) that the application is allowed to invoke.

Continuing in block 430, the system runs the identified application and monitors application behavior. During execution, the system may perform dynamic analysis or other monitoring to detect application behavior. The dynamic analysis accesses one or more application binary modules loaded in memory and determines what actions are performed by the binary code stored in the module. The actions may include some actions that are not considered harmful or interesting, such as performing internal calculations, and other actions that are potentially harmful, such as accessing data, sending information over the Internet or other network, accessing device hardware, and so forth. During execution, the system compares detected application behavior with the received accepted application behavior.

Continuing in decision block 440, if the system detects unapproved application behavior, then the system continues at block 450, else the system loops to block 430 to continue running the application. The system detects and identifies as bad behavior any behavior that does not match the received accepted application behavior. For example, if the application invokes an unexpected API, accesses unauthorized data, connects to an unauthorized network, or performs other unexpected actions, the system will notice and take action.

Continuing in block 450, the system blocks the application from performing the unapproved application behavior. For example, the system may intercept one or more functions of the application, provide a stub of the invoked API that returns a successful result to the application without actually taking any action normally performed by the API, and so forth. The system prevents the application from performing actions that the application is either not designed to perform or not authorized to perform. In some cases, applications that are normally safe may attempt to perform an unauthorized action because of compromise of the application by malware. The system detects changes in application behavior over time, even in applications that are generally safe.

Continuing in block 460, the system optionally warns the user to inform the user of the attempted unauthorized behavior. The system may display information in a dialog box, pop-up notification, iconic display, integrated in another user interface, or in any other manner that alerts the user to the unauthorized behavior. When displayed, the warning may request that the user indicate whether to continue executing the application (e.g., through Yes or No buttons).

Continuing in decision block 470, if the system receives a request to close the application, then the system closes the application and completes, else the system loops to block 430 to continue running and monitoring the application. The system may determine what action to take based on input from the user. For example, if the user expected the application behavior, then the user will likely allow the application to continue running. On the other hand, if the behavior is unexpected, then the user may terminate the application or perform additional corrective action such as invoking a virus scanner or other tools for verifying the application safety. After block 470, these steps conclude.

In some embodiments, the application safety system receives information describing an applications normal behavior from the application's developer or manufacturer. The developer can describe what the application is expected to do better than anyone can, and may provide a list of expected behavior to an operator of the system or with installation of the application that describes the developer's expectations. Behavior outside of the received expectations is then considered by the system to be anomalous, unexpected behavior that is harmful, and the system can shut down the application or block the unexpected behavior. If the application has been compromised by malware, then the malware will be limited in the harm it can do and may be restricted from running at all.

The system may also provide help to developers during application development. For example, the system may perform analysis and annotation during testing, note the normal use of the application, and output a signed table or other data structure that describes the applications native, uncompromised behavior. The system can then check future behavior against the known good behavior. The system may also provide feedback to the developer if the application performs an unexpected action while running anywhere, so the developer can improve the application.

In some embodiments, the application safety system compares application behavior with public information describing the application. Applications provided in application stores or from download or other services may identify a category associated with the application or provide other information that informs the system what the application is expected to do. For example, a picture editing application may be expected to access locally stored images, modify the image, and save the image to an image file. The system compares dynamically monitored behavior of the application with the application's claims to warn the user if the application includes spyware or other unexpected behavior, such as "phoning home" against the user's wishes.

In some embodiments, the application safety system detects an application's attempts to obfuscate the application's behavior and warns the user. Applications that attempt to hide what actions they are performing present a more likely threat to the user's computing device. Thus, for such applications the system may provide an enhanced level of warning and security. For example, the system may ask the user to approve application actions for each resource accessed by the application. The system may also warn the user that the application is obfuscating its behavior so the user can take appropriate action.

In some embodiments, the application safety system uses remote processing resources for static and/or dynamic analysis. For example, the system may access a cloud-based processing service, provide the application binary or other data, and request that the service provide a threat assessment by statically and/or dynamically analyzing the application. The remote service may have the resources to execute the application in a safe sandbox and to monitor what the application attempts to do. This information can then be used to inform the user what the application does and whether the application is potentially harmful.

From the foregoing, it will be appreciated that specific embodiments of the application safety system have been described herein for purposes of illustration, but that various modifications may be made without deviating from the spirit and scope of the invention. Accordingly, the invention is not limited except as by the appended claims.

I claim:

1. A computer-implemented method to handle installation and assess a threat level of a new application, the method comprising:
    identifying an application being installed on a computing device;
    performing static analysis on the identified application;
    determining a threat level to assign to the application based on the static analysis and detected behavior of the application, wherein the threat level describes one or more specific actions taken by the application that are potentially threatening;
    displaying the determined threat level to a user through a user interface; and
    upon determining that installation of the application is safe based on the user's response to the displayed threat level, installing the application on the computing device,
    wherein the preceding steps are performed by at least one processor.

2. The method of claim 1 wherein identifying the application comprises receiving a notification from an operating system running on the computing device that the application is being installed.

3. The method of claim 1 wherein identifying the application comprises determining metadata describing the application including a source of the application.

4. The method of claim 1 wherein performing static analysis comprises accessing one or more application binary modules and determining what actions are performed by the binary code stored in each module.

5. The method of claim 1 wherein performing static analysis comprises identifying actions that are potentially harmful to the computing device or a user.

6. The method of claim 1 wherein determining the threat level comprises determining a numerical or visual score indicating whether the application performs suspicious activity.

7. The method of claim 1 wherein determining the threat level comprises determining one or more categories of behavior performed by the application, as detected during static analysis.

8. The method of claim 1 wherein displaying the determined threat level comprises taking automatic action to allow or deny the application installation and displaying the action taken to the user.

9. The method of claim 1 wherein displaying the determined threat level comprises requesting that the user indicate whether to continue installing the application.

10. The method of claim 1 wherein determining that installation of the application is safe comprises receiving, after displaying the threat level to the user, the user's response to an inquiry requesting the user's approval to install the application.

11. The method of claim 1 further comprising, upon determining that installation of the application is not safe, denying installation of the application on the computing device.

12. The method of claim 1 wherein installing the application comprises installing the application to a dedicated location for further analysis upon executing the application.

13. The method of claim 1 further comprising storing the results of static analysis for use during subsequent analysis of the application's behavior.

14. A computer system for threat level assessment of applications, the system comprising:
    a processor and memory configured to execute software instructions embodied within the following components;
    an application identification component that identifies an application to analyze and for which to generate a threat assessment;
    a static analysis component that statically analyzes an application binary or other application code to determine how the application interacts with external resources;
    a dynamic analysis component that dynamically analyzes a running application to gather additional information related to the application's behavior that is difficult to determine with static analysis;
    a threat assessment component that determines a threat assessment level to associate with the application based on static and/or dynamic analysis performed on the application, wherein the threat assessment level describes one or more specific actions taken by the application that are potentially threatening;
    a baseline behavior component that determines a baseline behavior of the application that indicates a summary of actions that the application has taken in the past;
    an application behavior data store that stores information describing normal application behavior;
    an application-monitoring component that monitors the application each time the application is run to identify behavior that differs from the determined baseline behavior; and
    a user interface component that provides an interface for displaying the threat level to the user and receiving input from the user, wherein the user's response to the displayed threat assessment level determines whether the application is safe.

15. The system of claim 14 wherein the application identification component compares the application with a list of previously analyzed applications to determine what type of analysis to perform on the application.

16. The system of claim 14 wherein the static and dynamic analysis components provide information to the threat assessment component for reporting one or more detected issues to the user.

17. The system of claim 14 wherein the dynamic analysis component enforces one or more restrictions placed on the application by the user.

18. The system of claim 14 wherein the application behavior data store is shared among multiple users and provides aggregated data describing how the application behaves normally from which to detect behavior that would be out of the ordinary for the application.

19. A computer-readable storage device comprising instructions for controlling a computer system to monitor a running application and identify any harmful behavior, wherein the instructions, upon execution, cause a processor to perform actions comprising:
    identifying an application being executed on a computing device;
    performing dynamic analysis on the identified application, wherein dynamic analysis accesses one or more application binary modules loaded in memory and determines what actions are performed by the binary code stored in the module;

determining a threat level to assign to the application based on the dynamic analysis and detected behavior of the application, wherein the threat level describes one or more specific actions taken by the application that are potentially threatening;

determining whether the threat level has changed from a previously determined threat level;

upon determining that the threat level has changed, displaying the determined threat level to the user through a user interface wherein the displayed threat level includes the described one or more specific actions; and receiving an indication from the user of whether to continue running the application, wherein the user's response to the displayed threat level determines whether the application is safe.

20. The device of claim 19 further comprising, during dynamic analysis, accessing prior static analysis results and incorporating the results into the dynamic analysis.

* * * * *